United States Patent [19]

Wakamiya

[11] 3,825,997

[45] July 30, 1974

[54] METHOD FOR MAKING SEMICONDUCTOR DEVICE

[75] Inventor: Kinji Wakamiya, Tokyo, Japan

[73] Assignee: Sony Corporation, Tokyo, Japan

[22] Filed: May 22, 1972

[21] Appl. No.: 255,328

Related U.S. Application Data

[62] Division of Ser. No. 77,282, Oct. 1, 1970, abandoned.

[30] Foreign Application Priority Data

Oct. 2, 1969 Japan ............................ 44-78785

[52] U.S. Cl. ..................... 29/578, 29/589, 148/186

[51] Int. Cl. ........................................ B01j 17/00

[58] Field of Search ....... 29/578, 589, 590; 148/186

[56] References Cited

UNITED STATES PATENTS

| | | | |
|---|---|---|---|
| 3,463,977 | 8/1969 | Grove et al. | 317/235 |
| 3,570,114 | 3/1971 | Bean et al. | 29/577 |
| 3,573,571 | 4/1971 | Brown | 317/235 |
| 3,576,478 | 4/1971 | Watkins | 317/235 |

*Primary Examiner*—W. Tupman
*Attorney, Agent, or Firm*—Hill, Gross, Simpson, Van Santen, Steadman, Chiara & Simpson

[57] ABSTRACT

A method for constructing planar type semiconductor devices in which PN junctions of the device are exposed through an opening formed in a first insulating layer on the surface of the device and is then covered with a low resistivity polycrystalline semiconductor layer which is then covered with a second insulating layer such that voltage may be applied to the polycrystalline layer to provide a planar semiconductor substrate which has high break-down voltage.

8 Claims, 11 Drawing Figures

INVENTOR.
KINJI WAKAMIYA

By Hill, Sherman, Meroni, Gross & Simpson ATTORNEYS

INVENTOR.
KINJI WAKAMIYA

Hill, Sherman, Meroni, Gross & Simpson ATTORNEYS

PATENTED JUL 30 1974

3,825,997

SHEET 3 OF 3

INVENTOR

KINJI WAKAMIYA

Hill, Sherman, Meroni, Gross & Simpson ATTORNEYS

METHOD FOR MAKING SEMICONDUCTOR DEVICE

CROSS REFERENCES TO RELATED APPLICATION

This application is a divisional application of Ser. No. 77,282, filed Oct. 1, 1970 entitled "SEMICONDUCTOR DEVICE" in which the inventor is Kinji Wakamiya, and now abandoned.

BACKGROUND OF THE INVENTION

1. Field of the Invention

This invention relates to a semiconductor device, and more particularly to a semiconductor device of planar construction which can withstand high voltages without breakdown.

2. Description of the Prior Art

Heretofore, various semiconductor devices have been proposed in an attempt to raise the breakdown voltage. In one such conventional semi-conductor device a junction exposed at the surface of the semiconductor device is covered with a conductive layer through an insulating film. For example, in a transistor the base or emitter electrode may be extended by covering the base-collector junction with an insulating film. However, when the exposed junction is entirely covered by the base or emitter electrode, a bonding pad for connecting the base or emitter electrode with an external lead will be limited in size. Also the size of the bonding pad of the electrode prevents the junction from being completely covered with the extended electrode and a high breakdown voltage characteristic is not obtained.

SUMMARY OF THE INVENTION

In order to overcome these defects of the prior art, this invention utilizes a polycrystalline layer that can have high conductivity and which can be easily covered with an insulating film. The present invention has for its object the provision of a semiconductor device of high breakdown voltage in which the junction exposed at the surface of the device is entirely covered with a polycrystalline layer and the bonding pad can be formed without size restrictions.

One object of this invention is to provide a novel semiconductor device.

Another object of this invention is to provide a semiconductor device which has a high breakdown voltage.

A further object of this invention is to provide a semiconductor device in which the junction exposed at its surface through an insulating layer is completely covered with a conductive polycrystalline layer.

Still a further object of this invention is to provide a semiconductor device in which the conductive polycrystalline layer is formed with its end portion very close to the junction.

Other objects, features and advantages of this invention will become apparent from the following description taken in conjunction with the accompanying drawings.

DESCRIPTION OF THE PREFERRED EMBODIMENTS

Figure 1:
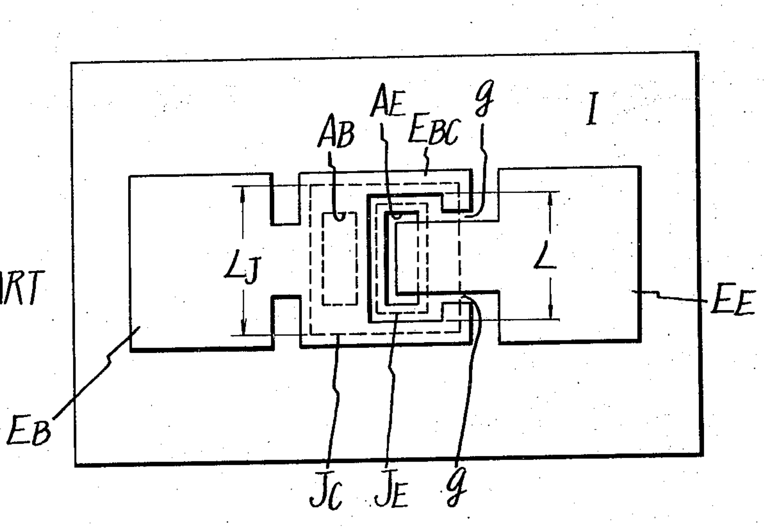
Fig. 1 PRIOR ART
FIG. 1 is a schematic plan view showing one example of a conventional semiconductor device, for explaining the present invention.

A conventional prior art type of planar transistor designed to have a high breakdown voltage is illustrated in FIG. 1. A base region is formed in a collector region to provide a collector junction $J_C$ therebetween and an emitter region is formed in the base region to provide an emitter junction $J_E$. An insulating layer I of silicon dioxide is formed on the collector, base and emitter regions. Windows $A_B$ and $A_E$ are formed in the insulating layer I on the base and emitter regions. Base and emitter electrodes $E_B$ and $E_E$ are formed on the insulating layer I and are connected to the base and emitter regions through the windows $A_B$ and $A_E$ respectively. In the illustrated example one portion $E_{BC}$ of the base electrode $E_B$ is extended and is formed on the insulating layer I over the collector junction $J_C$.

In such a transistor the extension $E_{BC}$ and one portion of the emitter electrode $E_E$ cover the collector junction $J_C$ over the insulating layer I so that the charge concentration at the surface of that area of the collector region covered with the extension $E_{BC}$ and the emitter electrode $E_E$ is decreased by an electric field resulting from a voltage supplied to the base and emitter electrodes $E_B$ and $E_E$. Thus, a depletion layer produced by a reverse bias impressed on the collector junction $J_C$ expands extensively into the collector region at the surface thereof to provide for higher breakdown voltage.

However, the extension $E_{BC}$ must be spaced away from the emitter electrode $E_E$, so that the collector junction $J_C$ is not covered by the extension $E_{BC}$ of the base electrode $E_B$ and emitter electrode $E_E$ in the area indicated by $g$. Consequently, the breakdown voltage cannot be raised at those portions $g$ of the collector junction which are not covered by the extension $E_{BC}$ and the emitter electrode $E_E$.

Where the extension $E_{BC}$ is formed so as to completely cover the collector junction $J_C$, the emitter electrode $E_E$ is surrounded by the extension $E_{BC}$ and decreases the area of the bonding pad for connecting the emitter electrode with an external lead. This makes it difficult to manufacture the transistor.

Further, the extension $E_{BC}$ must be wide so it will be accurately positioned on the collector junction $J_C$, even if the base electrode $E_B$ is a little out of position when it is formed. The distance L must be maintained shorter if possible than the width $L_J$ of the base region in FIG. 1. When the distance L is short, the extension $E_{BC}$ of the base electrode $E_B$ is likely to make contact with the emitter region, so that it is necessary to increase the width $L_J$ of the base region with the distance L being as the reference. This increases the area of the collector junction $J_C$ and increases the junction capacity, which is undesirable.

This invention provides a novel semiconductor device which is free from these drawbacks encountered in the prior art semiconductor devices.

Referring now to FIGS. 2A–2F', this invention will hereinafter be described to obtain a transistor having a high breakdown voltage characteristic and a method of making it.

Figure 2A:
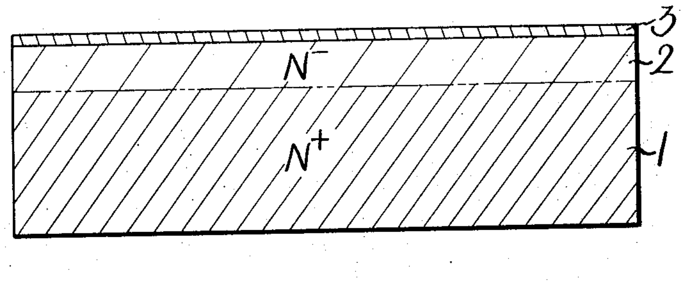
FIGS. 2A–2F' illustrate a sequence of steps involved in the manufacture of a transistor device according to this invention with FIG. 2F' being a plan view of FIG. 2F.

The transistor is formed by preparing a high impurity concentration N-type silicon semiconductor substrate 1 on one surface of which is formed a low impurity concentration silicon semiconductor vapor growth layer 2 of the same conductivity type as the substrate 1 to a thickness of several microns and which will ultimately serve as the collector region. Then, as shown in FIG. 2A, an insulating layer 3 is deposited on the vapor growth layer 2 and serves as an impurity diffusion mask. The insulating layer 3 may be formed of silicon dioxide $SiO_2$, silicon nitride $Si_3N_4$, aluminum oxide $Al_2O_3$, or the like.

Figure 2B:
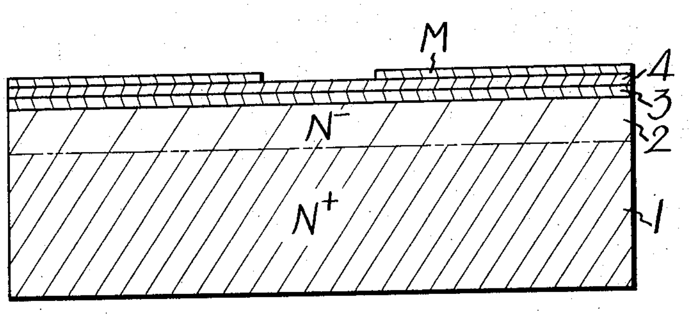

Then, an amorphous semiconductor layer 4 (hereinafter referred to as a polycrystalline layer) and an etching mask M are sequentially formed on the insulating layer 3 as depicted in FIG. 2B. The polycrystalline layer 4 is formed of a semiconductor which is oxidized at its surface to form an insulating layer in an oxygen, vapor or like oxidizing atmosphere and has a higher diffusion speed than monocrystalline semiconductor material. Thus, the polycrystalline layer 4 may be a silicon polycrystalline layer formed by vapor growth, an amorphous silicon layer formed by low-temperature vapor growth or a semiconductor layer formed by a sputtering or the like.

The etching mask M is formed of photo resist, for example, KPR or AZ.

Figure 2C:
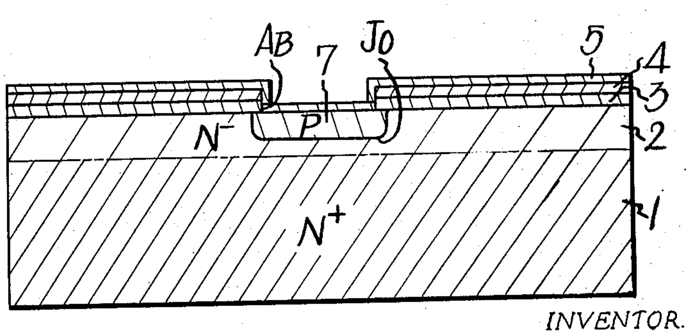

The next step consists in selective removal of the polycrystalline layer 4 and the insulating layer 3 by etching through the etching mask M to form a window $A_B$ for impurity diffusion. A P-type impurity is diffused through the window $A_B$ into the vapor growth layer 2 to form therein a base region 7 and a collector junction $J_C$ between the base region 7 and the vapor growth layer 2 as depicted in FIG. 2C. The diffusion of the P-type impurity is accomplished in an oxidizing atmosphere such as oxygen, vapor or the like in such a manner that no depression is formed in the surface of the base region 7.

The P-type impurity is diffused into the polycrystalline layer 4 simultaneously with the formation of the base region 7. Since the impurity diffusion speed in the polycrystalline layer 4 is high, the polycrystalline layer 4 is highly doped with the impurity which raises its conductivity. Further, during the formation of the base region 7, insulating layers 5 and 3 of silicon oxide films are formed by thermal oxidation on the polycrystalline layer 4 and the base region 7.

Figure 2D:
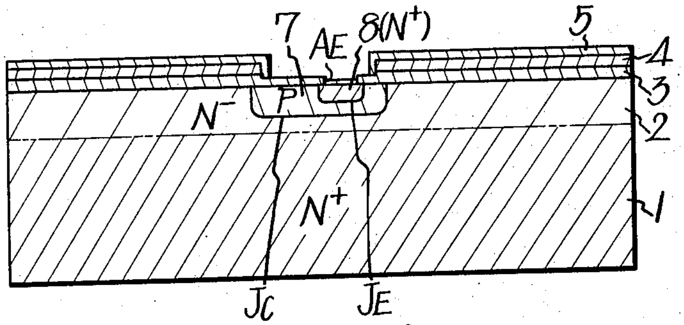

Next, a window $A_E$ for impurity diffusion is formed through the insulating layer 3 formed on the base region 7, and, an N-type impurity is diffused through the window $A_E$ into the base region to provide an emitter region 8 and an emitter junction $J_E$ as illustrated in FIG. 2D.

Figure 2E:
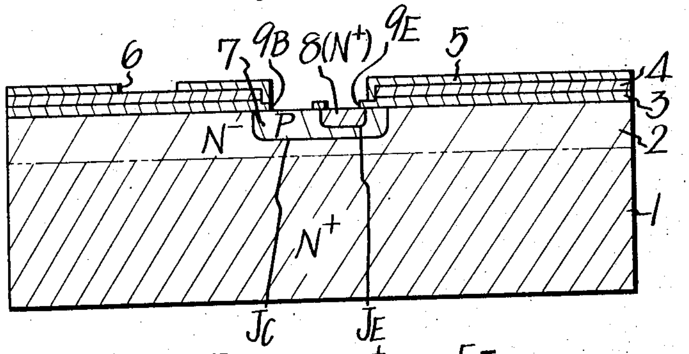

Thereafter, windows 9B, 9E and 6 are respectively formed through the insulating layer 3 on the base and emitter regions 7 and 8 and the insulating layer 5 on the polycrystalline layer 4 as depicted in FIG. 2E.

Figure 2F:
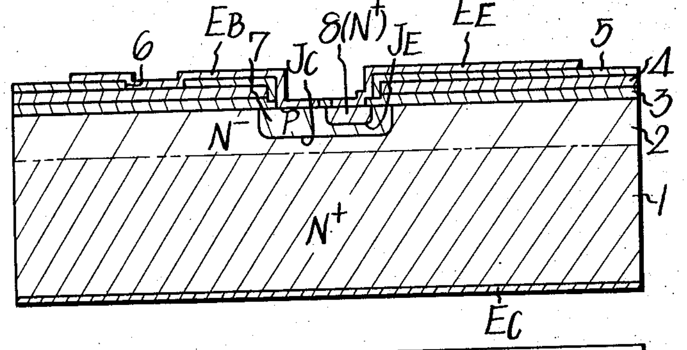
Figure 2F:
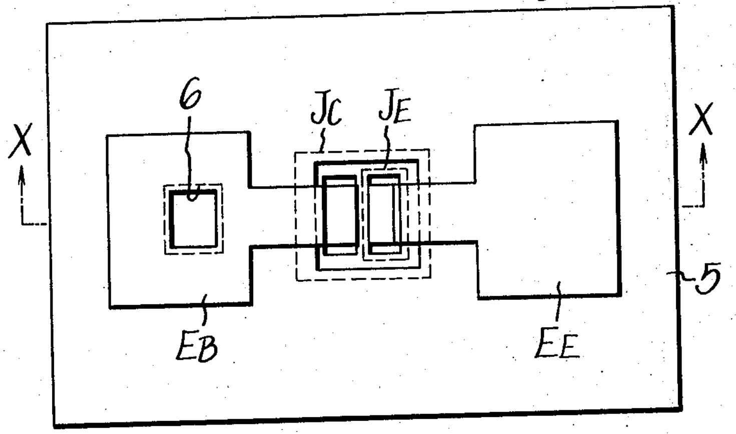

Then metal layer base and emitter electrodes $E_B$ and $E_E$ are deposited through the windows 9B and 9E on the base and emitter regions 7 and 8. In order to supply the polycrystalline layer 4 with a voltage to reversely bias the junction $J_C$ between the collector and base regions 2 and 7, the base electrode $E_B$ is formed to extend to the polycrystalline layer 4 through the window 6 and make ohmic contact with the layer 4 as shown in FIGS. 2F and 2F'. A collector electrode $E_C$ is formed on the back of the substrate 1, thus providing a transistor.

In the transistor thus produced, the polycrystalline layer 4 covers the vapor growth layer comprising the collector region 2. The base region 7 is formed in the collector region 2 by diffusion through the polycrystalline layer 4 which serves as a mask, so that the polycrystalline layer 4 also lies over the collector junction $J_C$. The polycrystalline layer 4 is made highly conductive during the formation of the base region 7 by means of diffusion. During operation, a bias voltage is fed to the base electrode $E_B$ and an electric field is established by the bias voltage around the collector junction $J_C$, thus raising the breakdown voltage of the transistor.

In the present invention the polycrystalline layer 4 is covered completely with the oxide film layer 5 which is formed by thermal oxidation during the formation of the base region 7 and the emitter electrode $E_E$ can be formed on the insulating layer 5. Since the collector junction $J_C$ is entirely covered with the polycrystalline layer 4 which is highly conductive, the junction is not exposed as in conventional transistors and the breakdown voltage of the transistor can be substantially increased.

In addition, the base and emitter electrodes $E_B$ and $E_E$ are not limited in size, and accordingly bonding pads as large as desired can be formed by extending the electrodes $E_E$ and $E_B$.

Further, since the base region 7, including the collector junction $J_C$ is formed by diffusion through the polycrystalline layer 4 which serves as a mask and which also applies an electric field to the collector junction $J_C$, the relative position of the polycrystalline layer 4 to the collector junction $J_C$ does not change. Thus, the base region 7 need not be made as large as in conventional transistors. Thus, the base region 7 can be small and the collector junction capacitance can be decreased relative to conventional transistors.

Figure 3A:
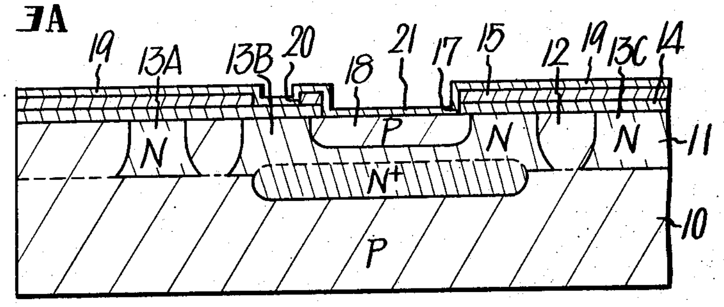
FIGS. 3A–3C illustrate a sequence of steps involved in the manufacture of a semiconductor integrated circuit according to this invention.
Figure 3B:
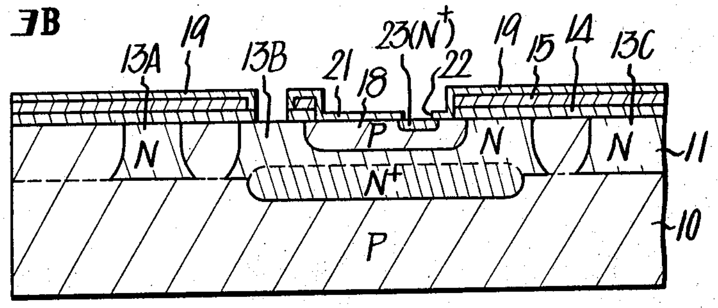
Figure 3C:
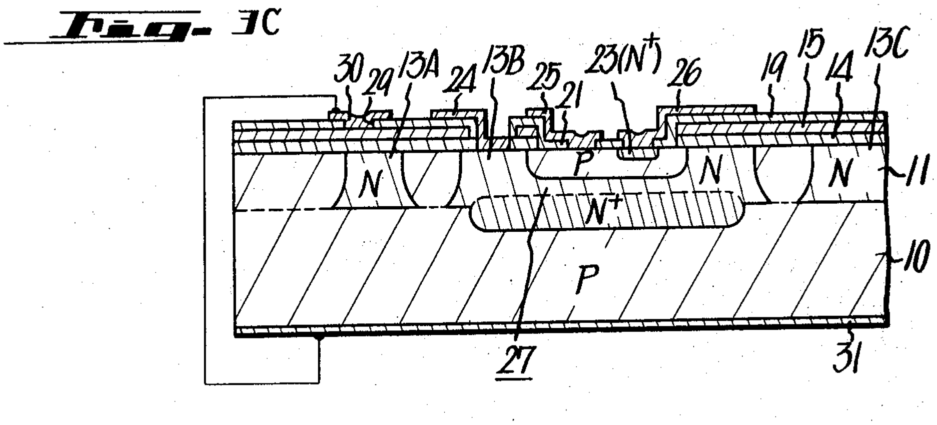

FIGS. 3A–3C illustrate another modification of this invention applied to a semiconductor integrated circuit having formed therein a plurality of semiconductor elements.

An N-type silicon vapor growth layer 11 is formed on one surface of, for example, a P-type semiconductor substrate 10 and P-type diffused regions 12 are formed by known techniques in the vapor growth layer 11 to divide it into a plurality of N-type island regions 13A, 13B and 13C as shown in FIG. 3A. An oxide film, comprising an insulating layer 14 is formed over the island regions 13A to 13C and the diffused regions 12. Then, a silicon polycrystalline layer 15 is formed on the insulating layer 14 by the same method as described above. Then the polycrystalline layer 15 and the insulating layer 14 are selectively etched away on island region 13B to form a window 17. A P-type impurity is diffused through the window 17 into the island region 13B to form a base region 18. The polycrystalline layer 15 is etched away to form a window 20 at a location where a collector electrode is to be formed. During diffusion the polycrystalline layer 15 is highly doped with the impurity to raise its conductivity. Further, since this impurity diffusion takes place in an oxidizing atmosphere, the polycrystalline layer 15 and the base region 18 are respectively coated with oxide films which form insulating layers 19 and 21.

Then the insulating layer 21 is selectively removed to form a window 22 through which an N-type impurity is diffused into the base region 18 to provide an emitter region 23 as illustrated in FIG. 3B.

Subsequent to the formation of the emitter region 23, the insulating layer 19 on the polycrystalline layer 15 is etched away at a predetermined area to provide a window 29, through which an electrode 30 is formed by deposition on the polycrystalline layer 15. The electrode 30 is connected by a lead to a substrate electrode 31, as shown in FIG. 3C. Similarly, collector, base and emitter electrodes 24, 25 and 26 are respectively formed by deposition on the collector, base and emitter regions 13B, 18 and 23, to thus form a transistor 27.

Although not shown, necessary semiconductor elements such as transistors, diodes, resistors or the like are formed on the other island regions 13A and 13C and impurity diffusion for these may be simultaneously accomplished by the diffusions in the island region 13B.

In this manner, a semiconductor integrated circuit with the transistor element 27 formed in the island region 13B is produced.

In such a semiconductor integrated circuit, when the respective electrodes are supplied with bias voltages the substrate electrode 31 is held at the lowest potential to electrically separate the elements of the island regions 13A to 13C from each other. Thus, the voltage of the polycrystalline layer 15 which is connected to the substrate electrode 31 is held at the lowest potential. Therefore, even if the working voltages of the respective elements vary, the polycrystalline layer 15 is always held at the lowest potential. Thus, the present invention increases the breakdown voltage of the transistor element 27 in the island region 13B and the breakdown voltages of the elements having PN junctions in the other island regions. Further, the breakdown voltage at the junctions between the island regions and regions isolated therefrom is increased.

It will be apparent that many modifications and variations may be effected without departing from the scope of the novel concepts of this invention.

I claim as my invention:

1. The method of forming a semiconductor substrate device comprising the steps of:

a. forming an insulating layer on one surface of said substrate,
b. forming a layer of polycrystalline layer over said insulating layer,
c. forming an etching mask with windows of photo resist over said polycrystalline layer,
d. etching through said mask to the surface of said substrate to form a window,
e. diffusing an impurity of type opposite to the impurity type of said substrate through said window into said substrate to form a base region and which highly dopes said polycrystalline layer, and a second insulating layer formed over said polycrystalline layer and said window,
f. etching through said second insulating layer formed in step (e) and diffusing an impurity of the same type as said substrate to form an emitter region in said base region,
g. forming windows to said base region and said polycrystalline layer,
h. forming a first conductor which extends through said windows to said base region and said polycrystalline layer,
i. forming a window to said emitter region, and
j. forming a second conductor which extends through said window to said emitter region.

2. The method of claim 1 comprising the additional step of forming a third electrode on the other surface of said substrate.

3. The method of claim 2 wherein said substrate has a high impurity concentration portion adjacent said other surface and a low impurity concentration portion adjacent said one surface.

4. The method of claim 1 wherein said insulating layer is step (a) is composed of insulating material selected from the group of silicon dioxide, silicon nitride, and aluminum oxide.

5. The method of claim 1 wherein the etching mask of step (c) is composed photo resist selected from the group KPR, AZ.

6. The method of forming a semiconductor substrate device comprising the steps of:

a. forming a silicon layer of a first conductivity type on a silicon substrate of a second conductivity type and divided by regions of a second conductivity type,
b. forming an insulating layer on said silicon layer,
c. forming a polycrystalline layer over said insulating layer with a second insulating layer on said polycrystalline layer,
d. forming a first window through the first and second insulating layers and said polycrystalline layer to said silicon layer of first conductivity type,
e. diffusing an impurity of a second conductivity type through said first window to form a base region in said silicon layer of first conductivity type and said impurity also diffusing into said polycrystalline layer,
f. forming a window through said second insulating layer and said polycrystalline layer to the silicon substrate of a first conductivity type,
g. forming a third window through said second insulating layer to said base region,
h. diffusing an impurity of a first conductivity type through said third window to form an emitter region,
i. forming a fourth window through said second insulating layer to said polycrystalline layer,
j. forming a collector electrode which extends through said second window to said collector,
k. forming an emitter electrode which extends through said third window to said emitter,
l. forming a base electrode which extends through first window to said base region, and
m. forming a polycrystalline electrode which extends through said fourth window to said polycrystalline layer.

7. The method of claim 6 comprising forming a conductive layer on the other side of said substrate and electrically connecting said conductive layer on the other side to said polycrystalline layer.

8. The method of claim 6 wherein said insulating layer in step (b) is composed of insulating material selected from the group of silicon dioxide, silicon nitride, and aluminum oxide.

* * * * *